United States Patent [19]

Gupta et al.

[11] Patent Number: 4,990,355

[45] Date of Patent: * Feb. 5, 1991

[54] LOW FAT SPREAD

[76] Inventors: Bharat B. Gupta, 92 Leighton Road, Weston, Bath, Avon, BA1 4NG; Brian L. Platt, 25 Fairfield, Sampford Peverell, Devon, EX16 7DE, both of England

[ * ] Notice: The portion of the term of this patent subsequent to Sep. 12, 2006 has been disclaimed.

[21] Appl. No.: 303,853

[22] Filed: Jan. 30, 1989

[30] Foreign Application Priority Data

Feb. 2, 1988 [GB] United Kingdom ................. 8802223

[51] Int. Cl.$^5$ ............................................... A23D 7/00
[52] U.S. Cl. .................................... 426/602; 426/603; 426/604; 426/804
[58] Field of Search ................ 426/602, 603, 604, 804

[56] References Cited

FOREIGN PATENT DOCUMENTS 1074176 3/1980 Canada .............................. 426/603
2150586 7/1985 United Kingdom ................ 426/603

Primary Examiner—Donald E. Czaja
Assistant Examiner—Drew Workman
Attorney, Agent, or Firm—Malcolm B. Wittenberg

[57] ABSTRACT

A low fat spread which is a water-in-oil emulsion comprising a continuous fat phase and a dispersed aqueous phase, the aqueous phase comprising at least 6% by weight of one or more proteins derived from milk and from 1.3 to 4.0% by weight of a modified starch, the fat phase comprising 18 to 37% by weight of the total composition of the low fat spread. The low fat spread of the invention has improved texture, mouthfeel and spreadability, as well as improved flavor.

19 Claims, No Drawings

LOW FAT SPREAD

The present invention relates to low fat spreads.

Low fat spreads are usually emulsions of the water-in-oil type, and are often used as substitutes for butter and margarine. In view of the general public concern about the adverse effects on health which fat-containing foodstuffs are said to have, it has become increasingly desirable to produce butter-like products having as low a fat content as possible.

The main aim in producing such low fat spreads is to reduce the fat content of the butter-like products to as low a level as possible and to improve the spreadability, whilst retaining the butter-like flavour. Although butter-like products having reduced fat contents are commercially available, a problem arises if one attempts to reduce the amount of fat down to a level of 35% by weight or less. When the amount of the fat phase is reduced to a level below 35% by weight of the composition, the resultant emulsion becomes unstable and may undergo phase inversion.

The patent literature contains various proposals for making low fat spreads of various formulations having a fat content below 35%. Typical of such earlier proposals are those disclosed in, for example, British Patent applications 2150585 and 2150586, U.S. Pat. No. 4536408, European Patents 11344, 11891 and 52899, and European Patent application 237120.

However, none of these proposals provides for a low fat spread having less than 35% fat, with a protein content as high as 6% by weight of the aqueous phase, while incorporating 1.3 to 4.0% by weight of a fully dispersed modified starch in the aqueous phase. Furthermore, as far as we are aware, none of these earlier proposals has given rise to successful commercial products which are on the market.

We have previously found that by incorporating a certain quantity of starch in a proteinaceous aqueous phase when forming the water-in-oil emulsion, the amount of fat phase in the composition can be reduced to 35% by weight or less, while avoiding the problem of phase inversion.

Low fat spreads according to our earlier invention are described in our UK Patent application Publication No. 2193221 which was not published until after the priority date of the present invention. These earlier low fat spreads are water-in-oil emulsions comprising a continuous fat phase and a dispersed aqueous phase, the aqueous phase comprising at least 8% by weight of one or more proteins derived from milk, and from 0.1 to 1.2% by weight of a modified starch, the fat phase constituting 18-35% by weight of the total weight of the low fat spread.

While these previously proposed low fat spreads show adequate spreadability and flavour, their texture and mouthfeel are not ideal, being somewhat chewy and lacking in smoothness. We have now found that by increasing the quantity of starch in the aqueous phase while simultaneously slightly reducing the amount of protein in the aqueous phase, a product with improved texture, mouthfeel, spreadability, and flavour is obtained.

Accordingly the present invention provides a low fat spread which is a water-in-oil emulsion comprising a continuous fat phase and a dispersed aqueous phase, the aqueous phase comprising at least 6% by weight of one or more proteins derived from milk, and from 1.3 to 4.0 by weight of a modified starch, the fat phase constituting 18-37% by weight of the total weight of the low fat spread.

In preferred low fat spreads in accordance with the invention, the fat phase constitutes 23 to 29% by weight of the composition.

Preferably the amount of proteins in the aqueous phase is 8.5 to 11.5% by weight of the aqueous phase.

Preferably the amount of starch in the aqueous phase is 1.3 to 2.7% by weight of the aqueous phase. More preferably the weight of starch in the aqueous phase is 1.3 to 2.1% by weight of the aqueous phase.

The starch in the aqueous phase is a modified starch, which is preferably in a pre-gelatinised form, typically a waxy maize starch or a potato starch or a tapioca starch, or a mixture thereof.

Examples of typical modified starches include white or yellow dextrin; roasted or dextrinated starch; acetylated distarch adipate; acetylated distarch phosphate; and hydroxypropyl distarch phosphate. Such modified starches and their preparation are described in "Proposal for a Council Directive on the Approximation of the Laws of the Member States Relating to Modified Starches Intended for Human Consumption", Official Journal of the European Communities, 1 Feb. 1985 Vol. 28, C. 31 1-6.

The proteins incorporated in the aqueous phase are proteins derived from milk, such as caseinates, or a concentrated solution of milk protein, or a whey protein concentrate, or a mixture thereof. The preferred protein source is a solution of sodium caseinate, or a protein concentrate obtained from soured skimmed milk or buttermilk, or a mixture thereof. Preferably the amount of protein, for example caseinate or soured milk proteins, is 5.0 to 9.5% by weight of the total composition.

In addition the aqueous phase may incorporate conventional additives such as salts for flavouring, sorbate as a preservative, and citrates and phosphates which act as chelating agents to improve the stability of the resultant emulsions. The additives are added in varying amounts, typically totalling 0.01 to 5% by weight of the composition; a person skilled in the art will readily be able to determine the optimum amounts of each additive.

The fat phase is preferably one having the following NMR percent solids values at the stated temperatures:

| Temperature: | 10° C. | 20° C. | 30° C. | 35° C. | 40° C. |
|---|---|---|---|---|---|
| NMR % solids: | 70–20 | 40–10 | 30–5 | 20–0 | 5–0 |

Typical oil formulations having these characteristics are given in the Examples which follow.

According to a further aspect of the present invention, there is provided a process for preparing a low fat spread in accordance with the invention, which process comprises:

(i) forming a water-in-oil emulsion from a continuous fat phase and a dispersed aqueous phase, the aqueous phase comprising at least 6% of one or more proteins derived from milk, and from 1.3 to 4.0% by weight of a modified starch, with the fat phase constituting 18 to 37% by weight of the total weight of the low fat spread, (ii) pasteurising the emulsion, (iii) cooling the emulsion to a temperature of 6° to 14° C., and (iv) processing the emulsion in a texturising unit.

Optionally, the cooling may be carried out in stages and the emulsion may be processed in a texturising unit after any one of the cooling stages and before the remaining cooling stage or stages.

In order to form the desired emulsion, the fat phase incorporates from 0.4 to 2% by weight of a conventional emulsifier such as a mono- or di-glyceride, or a lecithin, or a mixture thereof. The oil formulation which constitutes the fat phase is brought to a temperature of 40°–70° C. and introduced into an emulsification tank.

The acidity of the aqueous phase is adjusted to a pH of 5.8 to 6.7 by adding a neutralising agent such as sodium hydroxide solution or lactic acid. The temperature of the aqueous phase is brought to 35°–65° C. and the appropriate amount of this phase is introduced into the emulsification tank where the two phases are vigorously agitated at a temperature of from 40°–75° C. to produce a stable water-in-oil emulsion. The emulsion is then pasteurised in conventional manner, cooled and worked to obtain a product having a butter-like taste and texture.

We have found that low fat spreads in accordance with the invention, despite having a considerable reduction in fat content, are as acceptable to consumers as known products containing about 40% fat, and are more acceptable to consumers than low fat spreads made in accordance with our previous starch-containing low fat spreads as described in our UK Patent application Publication No. 2193221. Thus the products of the invention maintain the desired spreadability, mouthfeel and butter-like flavour and body, while being low in fat content and low in calories.

A typical low fat spread in accordance with the invention has the following composition:

| | |
|---|---|
| Protein Solution (11.5% protein content) | 72.2% |
| Fats | 24.0% |
| Salts | 1.5% |
| Modified Starch | 1.4% |
| Emulsifier | 0.7% |
| Sorbate | 0.2% |

While not wishing to be bound by the following theoretical considerations, we believe that the increased stability of the water-in-oil emulsions of the invention is due to an increase in the viscosity of the aqueous phase. If the protein content of a proteinaceous aqueous phase is increased far enough, with concomitant increase in viscosity, then a stable emulsion can be formed at a fat content below 30%. However, the texture and body of such emulsions are very poor. We have found that certain combinations of starch and protein in the aqueous phase show a synergistic effect on viscosity. Thus, by incorporating starch into a proteinaceous phase the desired increase in viscosity is obtained, and an emulsion with satisfactory body and texture can be made.

The synergistic effect which can be obtained by combinations of starch and protein in the aqueous phase is shown in the following table giving the viscosities of aqueous phases containing varying amounts of protein and starch.

Viscosity, in Poise, of aqueous phase containing:

| Protein % | Starch % | | | | |
|---|---|---|---|---|---|
| | 0 | 1 | 2 | 3 | 4 |
| 8 | 0.6 | 2.1 | 7.4 | 12.0 | 16.3 |
| 9 | 0.7 | 3.0 | 9.3 | 13.2 | 17.5 |
| 10 | 0.9 | 3.7 | 10.2 | 16.5 | 22.4 |
| 11 | 1.7 | 5.8 | 14.3 | 21.0 | 24.7 |

The viscosities were measured with a Ferranti-Shirley Cone and Plate Viscometer, under the following conditions:- cone diameter 7 cm, shear rate $500s^{-1}$, temperature of aqueous phase 45° C. An aqueous phase containing 11% protein derived from soured skimmed milk and buttermilk was prepared, and portions were diluted with whey containing the same concentration of salts as the first aqueous phase in order to obtain aqueous phases of 8, 9 and 10% protein. Starch (Instant Pure-Flo) was added directly to the water phase at 45° C. and was allowed to fully disperse before the measurements were made.

The results obtained show that for aqueous phases containing 11% or less protein, increasing the starch content by 1% gave a greater increase in viscosity than increasing the protein content by 1% or in most cases by more than 1%.

Evidence of an interaction between starch and protein is provided by the results of ultracentrifugation of aqueous phases of the same composition as those mentioned above. Ultracentrifugation at 25,000 rpm for 90 minutes at 45° C. gave contrasting results for aqueous phases of differing composition, as follows:

(i) aqueous phases of 8, 9 and 10% protein and 0 or 1% starch, or of 11% protein and 0% starch separated into a clear supernatant and a solid pellet.

(ii) aqueous phases of 10% protein and 2, 3 or 4% starch, or of 11% protein and 1 to 4% starch did not separate at all : the viscosity was presumably too great to allow separation to occur under the conditions used.

(iii) aqueous phases of 8 or 9% protein and 2, 3 or 4% starch separated into three layers: a solid top layer, a translucent liquid middle layer, and a solid bottom layer. The size of the top layer increased markedly as the starch content of the aqueous phase increased. Chemical analysis of the top and bottom layers showed that protein was present in both layers. Microscopy of the two layers showed that starch particles were present in both layers, with the starch particles in the top layer being smaller than those in the bottom layer. Protein particles were of similar size (<2um in diameter) in each layer.

We believe that the separation of a solid layer at the top containing both protein and starch particles on ultracentrifugation in some cases reflects an interaction between the starch and the protein which prevents the protein from sedimenting.

The present invention will now be illustrated by the following Examples:

EXAMPLE 1

Composition of Fat Phase 0.96 kg Soyabean Oil
2.64 kg Hydrogenated Soyabean Oil (m.p. 33° C.)
1.20 kg Palm Oil
0.10 kg Mono-Diglyceride Emulsifier
1 g Colour +Vitamins 2 g Flavouring Composition of Aqueous Phase 13.61 kg Whey
1.94 kg Sodium Caseinate Powder
0.22 kg Sodium Chloride
0.44 kg Snowflake 12615 Starch (a pre-gelatinised acetylated distarch phosphate, derived from waxy maize starch)
55 g Potassium Sorbate
55 g Trisodium Citrate Dihydrate
50 g Disodium Hydrogen Phosphate Dihydrate Preparation of the Fat Phase The components of the fat phase were combined and heated to 58° C. and agitated in an emulsion tank.

Preparation of the Aqueous Phase and of the Emulsion

The pH of the whey was adjusted to 6.0 with sodium hydroxide, the sodium caseinate powder was dissolved in it and the mixture was heated to 47° C. The remaining ingredients were added under agitation and the aqueous phase was left to stand, with agitation, for 20 minutes. After standing, 15.05 kg of the aqueous phase was transferred from the aqueous phase tank to the emulsion tank containing the fat phase. Vigorous agitation was maintained within the emulsion tank throughout this process and the addition rate of the aqueous phase to the fat phase was controlled at less than 1000 ml min$^{-1}$. The resultant emulsion was of the water-in-oil type. This emulsion was pasteurised in conventional manner by heating to 84° C. and maintaining this temperature for 2 seconds. The product was then cooled to 10° C. and worked in a Schroeder processor at a speed of 150 rpm to obtain a product having butter-like taste and texture.

The product was found to be spreadable from the refrigerator and was physically stable at ambient temperature, it exhibited a shelf life equivalent to other low fat dairy spreads, had a butter-like taste and was considered superior to many low fat spreads of considerably higher fat levels. It also had a better mouthfeel than low fat spreads of a similar fat level made according to our previous invention, being smoother and having a less chewy texture. The fat content was 24.5%, the protein content was 8.2%, the starch content was 2.0% and the calorie content was 260 kcals/100 g.

EXAMPLE 2

Composition of Fat Phase 5.09 kg Sunflowerseed Oil
2.18 kg Hydrogenated Palm Oil (m.p. 43° C.)
0.16 kg Mono-diglyceride Emulsifier
1 g Colour and Vitamins
6 g Butter Flavouring Composition of Aqueous Phase 12.36 kg Whey
1.45 kg Sodium Caseinate Powder
0.28 kg Sodium Chloride
0.235 kg Instant Pure-Flo Starch (a pregelatinised hydroxypropyl distarch phosphate, derived from waxy maize starch)
61 g Potassium Sorbate
61 g Trisodium Citrate Dihydrate
56.5 g Disodium Hydrogen Phosphate Dihydrate Preparation of the Fat Phase The components of the fat phase were combined and heated to 58° C. and agitated in an emulsion tank.

Preparation of the Aqueous Phase and of the Emulsion

The pH of the whey was adjusted to 6.3 with sodium hydroxide and the sodium caseinate was added. The mixture was heated to 48° C. and all the remaining ingredients were added under agitation. The aqueous phase was then left to stand for 20 minutes, while being agitated. 13.58 kg of the aqueous phase was then transferred to the virorously agitated fat phase in the emulsion tank, at a maximum rate of 800 ml min$^{-1}$. The resultant water-in-oil emulsion was pasteurised by heating to 84° C. for 2 seconds and was then cooled to 10° C., before being worked in a Schroeder processor at 200 rpm. The product was a soft spread containing a high proportion of polyunsaturated fatty acids, with a fat content of 35.3%, a protein content of 6.0%, and a starch content of 1.0%.

EXAMPLE 3

Composition of Fat Phase 1.92 kg Soyabean Oil
0.86 kg Palm Oil
0.43 kg Hydrogenated Soyabean Oil (m.p. 41° C.)
1.59 kg Hydrogenated Soyabean Oil (m.p. 38° C.)
0.14 kg Mono/Diglyceride Emulsifier
8 g Butter Flavour
1 β-Carotene/Vitamins Mix Composition of Aqueous Phase 15.67 kg Protein Concentrate obtained from Soured Skimmed Milk (80%) and Buttermilk (20%) (11.5% Protein)
0.22 kg Sodium Chloride
0.31 kg Instant Pure-Flo Starch (a pre-gelatinised hydroxypropyl distarch phosphate, derived from waxy maize starch)
27 g Potassium Sorbate
55 g Trisodium Citrate Dihydrate
50 g Disodium Hydrogen Phosphate Dihydrate.

The process used to produce the low-fat spread was the same as that described in Example 1 except that the fat phase temperature was 70° C., and that the aqueous phase was formed by heating the protein concentrate to 50° C., adding all the other ingredients except the starch, standardising the pH to 6.4 with sodium hydroxide, adding the starch and leaving the aqueous phase to stand for 20 minutes with agitation. Furthermore, 15.06 kg of the aqueous phase were added to the fat phase to form the emulsion. This emulsion was pasteurised and cooled as described in Example 1 and worked in a Schroeder processor at a speed of 500 rpm.

The properties of the product were as described in Example 1, except that the fat content was 24.7%, the protein content was 8.3%, the starch content was 1.4%, and the calorie content was 260 kcal/100 g.

EXAMPLE 4

Three low fat spreads were made, one (Spread 1) in accordance with our previous invention (UK Patent application Publication No. 2193221), and two in accordance with the present invention (Spreads 2A and 2B).

Composition

Fat: a fat phase containing a blend of vegetable oils with the following NMR percent solids content was used for all three spreads.

| Temperature: | 10° C. | 20° C. | 30° C. | 35° C. | 40° C. |
|---|---|---|---|---|---|
| % Solids: | 37.0 | 17.2 | 5.9 | 2.2 | 0 |

Protein: the protein in the aqueous phase of all three spreads was a protein concentrate obtained from soured skimmed milk (85%) and buttermilk (15%), but while the aqueous phase of Spread 1 contained 13.5% protein, the aqueous phase of Spreads 2A and 2B contained 11.5% protein.

Starch: Instant Pure-Flo starch was used in all three spreads, at a concentration of 0.93% of the aqueous phase of Spread 1, but at a concentration of 1.86% of the aqueous phase of Spreads 2A and 2B.

The final composition of the three spreads was as follows:

Spread 1: 24.7% fat, 9.8% protein, 0.7% starch
Spreads 2A and 2B: 24.7% fat, 8.2% protein, 1.4% starch

Process

Spread 1 was made according to the process described in Example 1 of UK Patent application 2193221, except that the emulsion was textured in a Crepaco processor at 600 rpm.

Spreads 2A and 2B were made according to the process described in Example 1 of this application, except that Spread 2A was texturised at a worker speed of 200 rpm, and that Spread 2B was texturised at a worker speed of 600 rpm, a Crepaco processor being used in both cases.

Sensory Testing

The three spreads were tested by a taste panel, and were graded according to the following characteristics: graininess, stickiness, firmness, chewiness, spreadability and flavour. Spread 1 had the worst scores for all characteristics except firmness, for which it was graded equivalent to the other two spreads. Spreads 2A and 2B were generally graded similarly, except that Spread 2A was more grainy and less sticky than Spread 2B.

Rheological Testing

The three spreads were further tested by means of a Bohlin Controlled Stress Rheometer. Creep and creep recovery tests, oscillation tests and stress viscometry tests were performed, the results of which can be related to sensory characteristics such as chewiness, mouthfeel perception, spreadability and stickiness. In each case the results showed that Spread 1 performed worst and Spread 2B performed best, with Spread 2A being intermediate in performance.

Thus, spreads made according to the present invention were shown to be superior in sensory properties to one made according to our previous invention.

What is claimed is:

1. A low fat spread which is a water-in-oil emulsion comprising a continuous fat phase and a dispersed aqueous phase, the aqueous phase comprising at least 6% by weight of one or more proteins derived from milk and from 1.3 to 4.0% by weight of a modified starch, the fat phase comprising 18 to 37% by weight of the total composition of the low fat spread.

2. A low fat spread according to claim 1 wherein the modified starch is a member selected from the group consisting of a waxy maize starch, potato starch, tapioca starch and mixtures thereof.

3. A low fat spread according to claim 1, wherein the starch is white or yellow dextrin, or roasted or dextrinated starch.

4. A low fat spread according to claim 1, wherein the starch is acetylated distarch adipate.

5. A low fat spread according to claim 1, wherein the starch is an acetylated distarch phosphate.

6. A low fat spread according to claim 1, wherein the starch is hydroxypropyl distarch phosphate.

7. A low fat spread according to claim 1, wherein the starch is in pre-gelatinised form.

8. A low fat spread according to claim 1, wherein the proteins are a member selected from the group consisting of caseinates, a concentrated solution of milk protein, a whey protein concentrate and mixtures thereof.

9. A low fat spread according to claim 8, wherein the protein is a member selected from the group consisting of a solution of sodium caseinate, a protein concentrate obtained from soured skimmed milk, a protein concentrate obtained from buttermilk and mixtures thereof.

10. A low fat spread according to claim 8, wherein the amount of proteins is 8.5 to 11.5% by weight of the aqueous phase.

11. A low fat spread according to claim 1, wherein the amount of proteins is 5.0 to 9.5% by weight of the total composition.

12. A low fat spread according to claim 1, wherein the fat phase is one having the following NMR percent solids values at the stated temperature

| Temperature: | 10° C. | 20° C. | 30° C. | 35° C. | 40° C. |
|---|---|---|---|---|---|
| NMR % solids: | 70–20 | 40–10 | 30–5 | 20–0 | 5–0 |

13. A low fat spread according to claim 1, wherein the fat phase constitutes 23–29% by weight of the composition.

14. A low fat spread according to claim 1, wherein the amount of modified starch is from 1.3 to 2.7% by weight of the aqueous phase.

15. A low fat spread according to claim 14, wherein the amount of modified starch is from 1.3 to 2.1% by weight of the aqueous phase.

16. A low fat spread according to claim 1, having the following composition:

| | |
|---|---|
| u4 | 72.2% |
| (11.5% protein content) | |
| Fats | 24.0% |
| Salts | 1.5% |
| Modified Starch | 1.4% |
| Emulsifier | 0.7% |
| Sorbate | 0.2% |

17. A process for preparing a low fat spread as defined in claim 1, which process comprises
(i) forming a water-in-oil emulsion from a continuous fat phase and a dispersed aqueous phase, the aqueous phase comprising at least 6% of one or more proteins derived from milk, and from 1.3 to 4.0% by weight of a modified starch, with the fat phase constituting 18 to 37% by weight of the total weight of the low fat spread
(ii) pasteurising the emulsion,
(iii) cooling the emulsion to a temperature of 6 to 12° C., and
(iv) processing the emulsion in a texturising unit.

18. A process according to claim 17, wherein the cooling is carried out in stages and the emulsion is processed in a texturising unit after any one of the cooling stages.

19. A process according to claim 17, wherein the emulsion is cooled to 10° C.

* * * * *